(12) United States Patent
Hareuveni et al.

(10) Patent No.: US 12,156,182 B2
(45) Date of Patent: Nov. 26, 2024

(54) TECHNIQUES FOR MULTI-MEDIUM ACCESS CONTROL (MAC) COMMUNICATION DEVICES

(71) Applicant: Intel Corporation, Santa Clara, CA (US)

(72) Inventors: Ofer Hareuveni, Haifa (IL); Elad Oren, Tel Aviv (IL); Johannes Berg, Detmold (DE)

(73) Assignee: Intel Corporation, Santa Clara, CA (US)

( * ) Notice: Subject to any disclaimer, the term of this patent is extended or adjusted under 35 U.S.C. 154(b) by 820 days.

(21) Appl. No.: 17/130,930

(22) Filed: Dec. 22, 2020

(65) Prior Publication Data

US 2021/0235429 A1 Jul. 29, 2021

(51) Int. Cl.
*H04W 72/044* (2023.01)
*H04W 72/54* (2023.01)
*H04W 74/0808* (2024.01)
*H04W 80/00* (2009.01)

(52) U.S. Cl.
CPC ..... *H04W 72/044* (2013.01); *H04W 72/0473* (2013.01); *H04W 72/54* (2023.01); *H04W 74/0808* (2013.01); *H04W 80/00* (2013.01)

(58) Field of Classification Search
None
See application file for complete search history.

(56) References Cited

U.S. PATENT DOCUMENTS

| | | | |
|---|---|---|---|
| 2007/0288653 A1 | 12/2007 | Sargor et al. | |
| 2008/0013504 A1* | 1/2008 | Nishibayashi | G09G 3/2096 370/338 |
| 2013/0258921 A1* | 10/2013 | Gevorkov | H04W 72/569 370/329 |
| 2015/0117367 A1 | 4/2015 | Manapragada | |
| 2018/0175924 A1* | 6/2018 | Ercan | H04W 76/16 |
| 2019/0037595 A1* | 1/2019 | Cherian | H04W 74/006 |
| 2020/0280370 A1* | 9/2020 | Frozenfar | H04B 10/25891 |
| 2021/0266735 A1* | 8/2021 | Hu | H04W 76/10 |

FOREIGN PATENT DOCUMENTS

WO 2020000430 A1 1/2020

OTHER PUBLICATIONS

Federal Communications Commission; "Notice of Proposed Rulemaking," Before the Federal Communications Commission Washington, D.C. 20554; Adopted: Oct. 23, 2018, Released: Oct. 24, 2018; In the Matter of Unlicensed Use of the 6 GHz Band AND Expanding Flexible Use in Mid-Band Spectrum Between 3.7 and 24 Ghz; FCC 18-147, 53 pages.

Extended European Search Report for Application No. 21197415.9 received from EPO mailed on Mar. 25, 2022, 11 pages.

* cited by examiner

*Primary Examiner* — Mohammad S Adhami

(74) *Attorney, Agent, or Firm* — Schwabe, Williamson & Wyatt, P.C.

(57) ABSTRACT

Embodiments of the present disclosure provide techniques for a multi-radio device (e.g., referred to as a wireless station (STA)) to utilize multiple virtual medium access control layers (vMACs) for concurrent operations using the radios. The vMACs may have different medium access control (MAC) addresses and may be designated for different operations that use the radios. Other embodiments may be described and claimed.

23 Claims, 8 Drawing Sheets

TECHNIQUES FOR MULTI-MEDIUM ACCESS CONTROL (MAC) COMMUNICATION DEVICES

FIELD

Embodiments of the present invention relate generally to the technical field of wireless communications.

BACKGROUND

Some wireless local area network (WLAN) devices perform multiple types of communication and/or sensing operations using WLAN radio resources, such as client access to network services via an access point (AP, also referred to as a basic service set (BSS) communication), peer-to-peer (P2P) communication, etc. However, these devices have not been able to efficiently manage concurrent operation of multiple types of communication and/or sensing.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
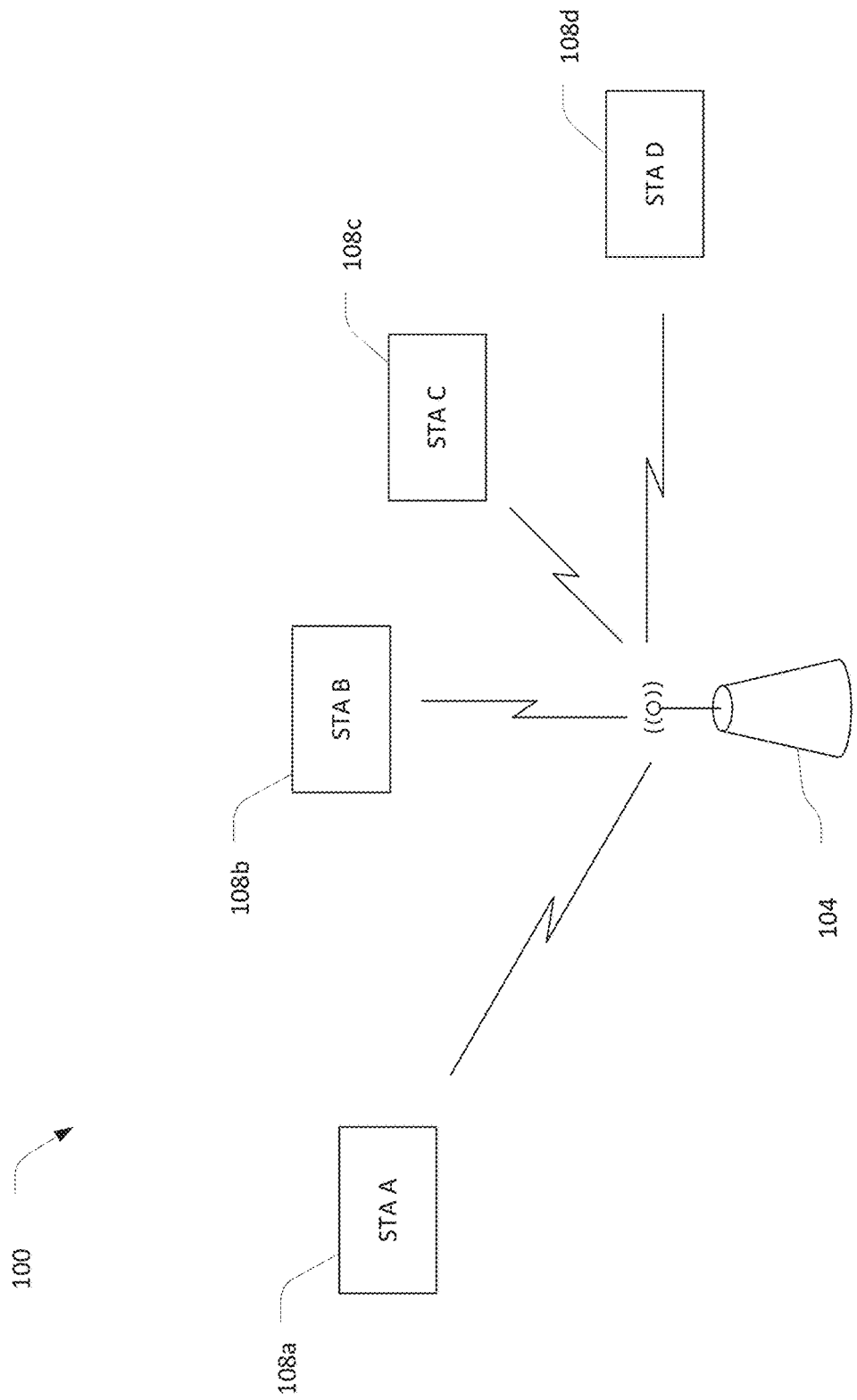
FIG. 1 illustrates a network in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details.

In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System-on-Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

Various embodiments herein provide techniques for a multi-radio device (e.g., referred to as a wireless station (STA)) to utilize multiple virtual medium access control layers (vMACs) for concurrent operations using the radios. The vMACs may have different medium access control (MAC) addresses and may be designated for different operations that use the radios. In some embodiments, one or more of the operations may be wireless local area network (WLAN) operations that are in accordance with one or more IEEE 802.11 protocols. In various embodiments, virtual physical layers (vPHYs) and/or radio circuits (e.g., including one or more transmitters and/or receivers) may be allocated to the respective vMACs. In some embodiments, the allocations may be dynamically adjusted over time. Furthermore, embodiments may include allocating radio resources (e.g., transmitters and/or receivers) to the radio circuits and/or allocating physical layer (PHY) resources to the vPHYs, e.g., based on the characteristics of the operations to be performed by the vMACs.

Regulatory agencies and standards bodies, including Federal Communications Commission (FCC) and the European Telecommunications Standardization Institute (ETSI) are in the process of allowing unlicensed use in the 5.925-7.125 GHz frequency band (also referred to as the 6 GHz or ultra-high band (UHB) band). With the availability of the 6 GHz band, the available spectrum for Wi-Fi use may be approximately doubled relative to the existing spectrum for unlicensed use in the 2.4 GHz and 5 GHz bands. The additional spectrum may provide opportunities for a multi-radio IEEE 802.11 apparatus to perform concurrent operations, such as communication, ranging, and/or environment sensing operations. However, providing concurrent multi-radio operation is difficult, e.g., due to multiple sets of constraints, such as regulatory limitations, spectrum sharing with other technologies, radio design, and/or adjacent channel interference.

The embodiments herein may allow utilization of a single Wi-Fi apparatus with multiple radios to perform a plurality of independent communication and/or sensing operations, while optimizing the overall performance. For example, the operations may include infrastructure network and Access Point (AP) selection, peer-to-peer (P2P) networking, ranging and/or indoor positioning (e.g., based on received signal strength indicator (RSSI) measurements and/or round-trip time (RTT) measurements), environment sensing (e.g., based on channel mapping), searching for available channels and/or APs (e.g., including radar detection), etc. Some examples of operations (MAC roles) that may be performed concurrently are shown in Table 5 below.

In embodiments, the concurrent operations performed by the vMACs (and associated vPHYs and/or radio circuits) may be performed in an extended 5-7 GHz band (e.g., including the high band (HB, or 5 GHz band) and the UHB band). The solutions described herein may consider the capabilities and limitations of same band concurrency in the extended 5-7 GHz band. Furthermore, embodiments may use advanced radio capabilities, such as flexible assignment of transmit and receive radio chains to be configured to operate in different channels. For example, some embodiments may include switching a pair of chains from multiple input, multiple output (MIMO) operation into two single input, single output (SISO) operations on different channels.

The embodiments herein may enable new concurrent and/or reliable user experiences, improved user perceived quality of service, and/or smaller footprint/cost. For example, embodiments may enable a single IEEE 802.11 apparatus and its set of RF components (antennas, diplexers), host interface resources, connectors, and/or power supplies, to perform multiple operations such as communication, indoor navigation, and environment sensing, instead of using different devices. Additionally, use cases enabled by the techniques herein may include one or more of multiple basic service set (BSS) connections, multiple band connections to a single AP, Peer2Peer connections, tethering, range extension, mesh, Wi-Fi sensing, remote wakeup, and/or indoor positioning, etc.

FIG. 1 illustrates a network 100 in accordance with some embodiments. The network 100 may include an access point (AP) 104 communicatively coupled with a plurality of STAs including, for example, STA A 108a, STA B 108b, STA C 108c, and STA D 108d (collectively referred to as STAs 108a-d). The network 100 may be a wireless local area network (WLAN) that is compatible with IEEE 802.11 protocols. In some embodiments, the network 100 may also be referred to as a basic service set (BSS). In some embodiments, the STAs 108a-d may additionally or alternatively communicate with one another, e.g., via peer-to-peer (P2P) communication.

In various embodiments, the individual STAs 108a-d may include a plurality of virtual medium access control layers (vMACs) associated with separate medium access control (MAC) addresses. The vMACs may include an allocation of MAC resources of the STA 108a-d, e.g., from a pool of MAC resources that implements a MAC layer of the STA 108a-c. For example, the MAC resources may include one or more queues, first-in-first-outs (FIFOs), counters, direct memory access (DMA) circuitry, timers, static and/or dynamic memory, firmware, processor circuitry, and/or other resources. In various embodiments, the vMACs may be implemented in a baseband circuitry of the STA 108a-c.

The individual STAs 108a-d may further include a plurality of virtual physical layers (vPHYs). The vPHYs may include an allocation of PHY resources of the STA 108a-d, e.g., from a pool of PHY resources of the STA 108a-d. For example, the PHY resources may include one or more energy and preamble detectors, analog-to-digital converters (ADCs), digital-to-analog converters (DACs), signal processors, firmware, static memories, buffers, Fast Fourier transform circuitry, error correction coding and/or decoding circuits, channel estimation processors, accurate timing measurement circuitry, and/or other resources. In embodiments, the vPHYs may be implemented in the baseband circuitry of the STA 108a-c.

In various embodiments, the STAs 108a-d may further include a plurality of radio circuits. The radio circuits may include one or more transmitters and/or receivers. The transmitters and/or receivers may include circuitry to convert signals between baseband and radio frequency (RF). For example, the transmitters may receive baseband signals from the vPHYs and convert the baseband signals to RF signals for transmission via one or more antennas of the STA 108a-d. The receivers may receive RF signals from the one or more antennas and convert the RF signals to baseband signals (e.g., to be processed by the vPHYs and/or vMACs). In some embodiments in which the radio circuit includes both transmit and receive functionality (e.g., a transceiver), the transmit and receive circuits may share one or more components.

In embodiments, the radio circuits may include one or more RF front end components, such as one or more mixers (e.g., phase-locked loop (PLL) mixers), RF switches, filters, diplexers, amplifiers (e.g., low noise amplifiers (LNAs) and/or power amplifiers), adaptive gain control (AGC) circuitry, and/or other components.

In various embodiments, the vPHYs and/or radio circuits may be allocated to respective vMACs, The vMACs may be used to perform different WLAN operations for the STA 108a-d. Accordingly, the vMACs and associated vPHYs and radio circuits may enable concurrent operation of multiple WLAN operations by the STA 108a-d. In embodiments, external devices may view the different vMACs and associated vPHYs as separate devices for purposes of the WLAN operations.

Figure 2:
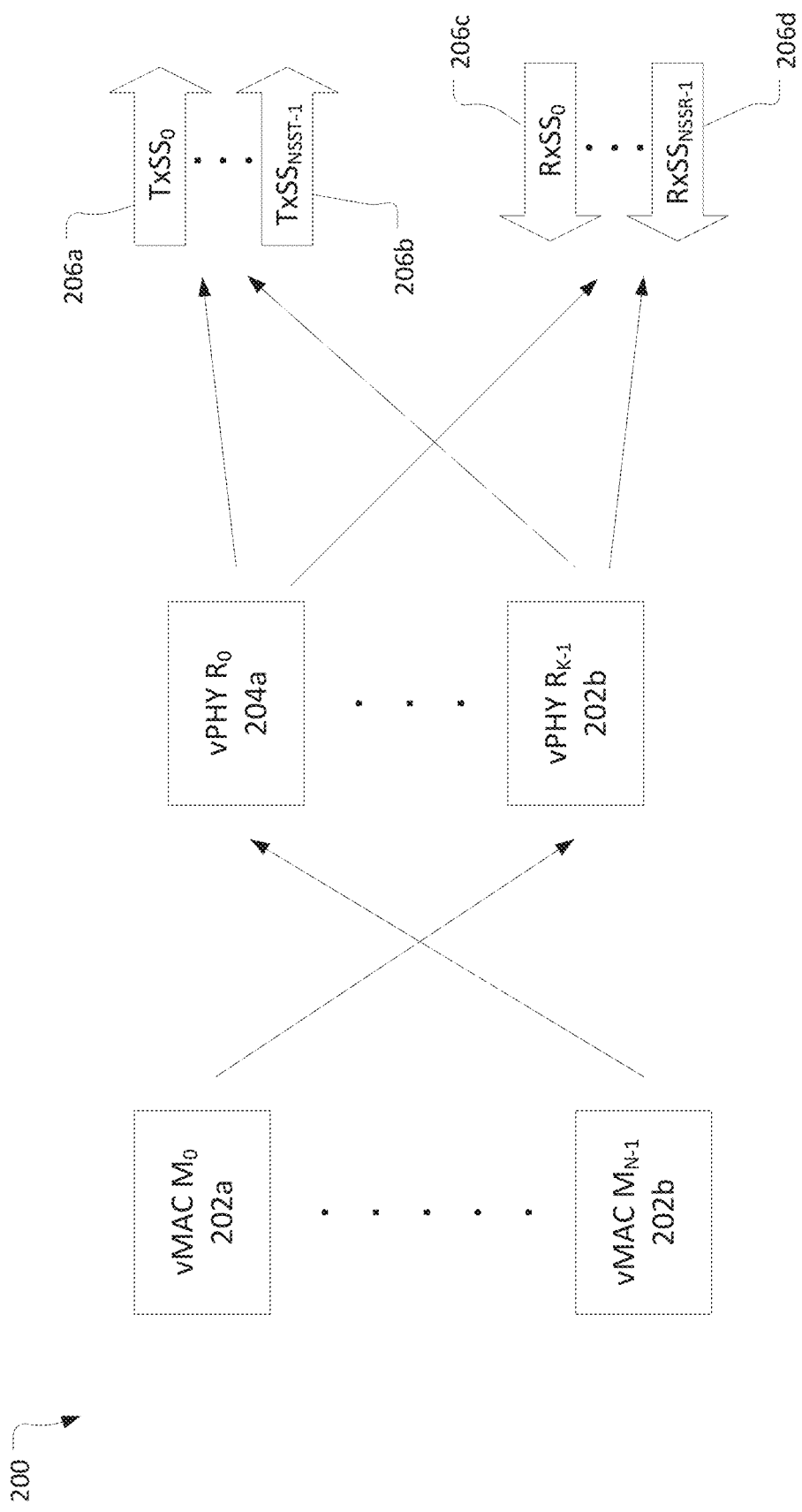
FIG. 2 illustrates an example of allocation of virtual physical layer (vPHY) resources to virtual medium access control (vMAC) resources, in accordance with some embodiments.

FIG. 2 illustrates schematically illustrates an example allocation scheme for an STA 200 (which may correspond to the STAs 108a-d) in accordance with various embodiments. The STA 200 may include a plurality of vMACs 202a-b, a plurality of vPHYs 204a-b, and a plurality of radio circuits 206a-d.

In various embodiments, the vMACs 202a-b may be designated to perform different WLAN operations for the STA 200. The STA 200 may allocate vPHYs 204a-b and/or radio circuits 206a-d to the respective vMACs 202a-b. For example, the allocations may include allocating radio resources of the STA 200 among the radio circuits 206a-d and/or allocating PHY resources among the vPHYs 204a-b to enable allocation of the radio resources and/or PHY resources to respective vMACs 202a-b. Additionally, or alternatively, multiple vMACs 202a-b may use the same PHY resources (e.g., vPHY 204a-b) and/or radio resources (e.g., radio circuit 206a-d) in a time-division multiplexed (TDM) manner.

The radio circuits 206a-d may include one or more transmitters or receivers to transmit or receive respective spatial streams. For example radio circuit 206a and 206b may include transmitters to transmit respective transmit spatial streams (TxSSs), while the radio circuits 206c and 206d may include receivers to receive respective spatial streams (RxSSs). In some embodiments, a transmitter and receiver may share one or more components.

In some embodiments, the vPHYs 204a-b and/or radio circuits 206a-d may be homogenous (e.g., have the same components, configuration, and/or capability) or heterogenous (e.g., have different components, configurations, and/or capabilities). For example, one vPHY 204a-b and/or radio circuit 206a-d may support MIMO communication, while another vPHY 204a-b and/or radio circuit 206a-d may only support SISO communication (or may support MIMO communication with a different number of MIMO layers, such as 2 and 4 layers). As another example, different radio circuits 206a-d (e.g., transmitters and/or receivers) may be capable of operating in different frequency ranges and/or may have interdependent frequency ranges that are based on the frequency range of an adjacent radio circuit 206a-d.

Similarly, in some embodiments, the vPHYs 204a-b may all have access to all of the radio circuits 206a-d. In other embodiments, different vPHYs 204a-b may have access to different sets of one or more radio circuits 206a-d (which may or may not overlap).

In various embodiments, the vPHYs 204a-b and/or radio circuits 206a-d may be allocated to respective vMACs 202a-b. In some embodiments, the allocations may be dynamically changed over time based on one or more criteria, such as the requirements of the operations and/or the number of operations to be performed. An individual vMAC 202a-b may typically be associated with zero or one vPHY 204a-b and/or zero, one, or multiple radio circuits 206a-d at any given time. Additionally, in some embodiments, multiple vMACs 202a-b may use the same radio circuits 206a-d in a time-division multiplexed (TDM) manner.

Additionally, the STA 200 may determine the vPHY resources that are allocated to the vPHYs 204a-b and/or the radio circuitry that is allocated to the radio circuits 206a-d based on the needs of the vMACs 202a-b and/or the associated WLAN operations. For example, different WLAN operations may have different frequency bandwidths, frequency bands, quality of service (QoS) requirements, periodicity, and/or other characteristics.

Additionally, the configuration of the vPHYs 204a-b and/or radio circuits 206a-d (e.g., the respective PHY resources or radio resources that are included therein) may be dynamically adjusted over time. For example, in some embodiments, a multiple input, multiple output (MIMO) radio circuit that is capable of MIMO communications may be split into multiple single input, single output (SISO) radio circuits for purposes of allocation to the vPHYs 204a-b and/or vMACs 202a-b. Additionally, or alternatively, a radio circuit with a transmitter and receiver may be split into two radio circuits for allocation purposes, wherein one of the radio circuits includes the transmitter and the other radio circuit includes the receiver.

Additionally, in embodiments in which the vPHYs 204a-b have access to different sets of the one or more radio circuits 206a-d and/or in which the vPHYs 204a-b and/or radio circuits 206a-d have different capabilities, the allocation of the vPHYs 204a-b and/or radio circuits 206a-d may be made based on the WLAN operations to be performed by the respective vMACs 202a-b and the capabilities of the vPHYs 204a-b and/or radio circuits 206a-d.

In embodiments, the STA 200 may allocate the vPHYs 204a-b and/or radio circuits 206a-d to the vMACs 202a-b (and/or allocate resources to the vPHYs 204a-b and/or radio circuits 206a-d) based on one or more targets. For example, the allocation may be made based on (e.g., to optimize) aggregated throughput, vMAC specific throughput (e.g., for one or more prioritized vMACs), QoS, range, power consumption, and/or another target.

An example allocation process to optimize for the aggregated throughput of all vMACs as a single optimization parameter is described below. In the example, it is assumed that all the vPHYs can support any SISO or MIMO radio configuration that is supported by the radio transmitters and receivers. Similar techniques may be used to optimize the allocation for one or more other target parameters, and/or in the presence of additional constraints on allowable allocations.

The example is described with reference to a wireless station in which each vPHY can support any collection of transmitters and receivers. Accordingly, the allocation process maps transmitters and receivers to a vMAC. The notation of TxR may refer to a set of T transmitters and R receivers that form radio RADj, and RM[i] corresponds to the mapping function of RADj to $MAC_i$.

For example, in a device with radio capabilities allowing one radio, $RAD_0$, to be mapped to a first frequency range (e.g., 5170-5815 GHz) and a second radio, $RAD_1$, to be mapped to a second frequency range (e.g., 5935-7120 GHz), and having 3 vMACs, there are 8 different vMAC to RAD allocations as shown in Table 1 (the entry in the table indicates the radio ($RAD_0$ or $RAD_1$) for the allocation, and each row is a different allocation).

TABLE 1

| RM Function Mapping Option | $MAC_0$ | $MAC_1$ | $MAC_2$ |
|---|---|---|---|
| 0 | $RAD_0$ | $RAD_0$ | $RAD_0$ |
| 1 | $RAD_0$ | $RAD_0$ | $RAD_1$ |
| 2 | $RAD_0$ | $RAD_1$ | $RAD_0$ |
| 3 | $RAD_0$ | $RAD_1$ | $RAD_1$ |
| 4 | $RAD_1$ | $RAD_0$ | $RAD_0$ |
| 5 | $RAD_1$ | $RAD_0$ | $RAD_1$ |
| 6 | $RAD_1$ | $RAD_1$ | $RAD_0$ |
| 7 | $RAD_1$ | $RAD_1$ | $RAD_1$ |

In general, there may be $K^N$ different allocations of N vMACs to K RADs.

For each vMAC, there is a profile of its expected transmit (Tx) and receive (Rx) duty cycles. In addition, let $CR_{Mi}$ be a cost coefficient of the Rx of $M_i$ given an allocation RM[0] . . . . RM[n−1], so $CR_{Mi}$(RM[0], RM[1], . . . . RM[n−1]) represents the (degraded) Rx performance due to the allocation of the N vMACs on K radios.

For example, for 2 radio ($RAD_0$, $RAD_1$), and 2 vMACs ($MAC_0$, $MAC_1$), with the Tx/Rx profiles shown in Table 2, $CR_{M1}$ (The actual Rx duty cycle of $MAC_1$ due to interference of $MAC_0$) can be determined according to Table 3.

TABLE 2

|  | $MAC_0$ | $MAC_1$ |
|---|---|---|
| TX | 0.7 | 0.1 |
| RX | 0.3 | 0.3 |

TABLE 3

|  | RM[1] = 0 | RM[1] = 1 |
|---|---|---|
| RM[0] = 0 | 0.5*0.3 = 0.15 | (1-0.7)*0.3 = 0.09 |
| RM[0] = 1 | (1-0.7)*0.3 = 0.09 | 0.5*0.3 = 0.15 |

As it can be seen, $CR_{Mi}$ is a function of the allocation of all the vMACs to the RADs, and can be different for each allocation. CR reflects the mutual interference that the Tx of one radio influences the Rx of another radio. When two vMACs are allocated to the same RAD, there may be an assumption is that they share the medium.

Figure 3:
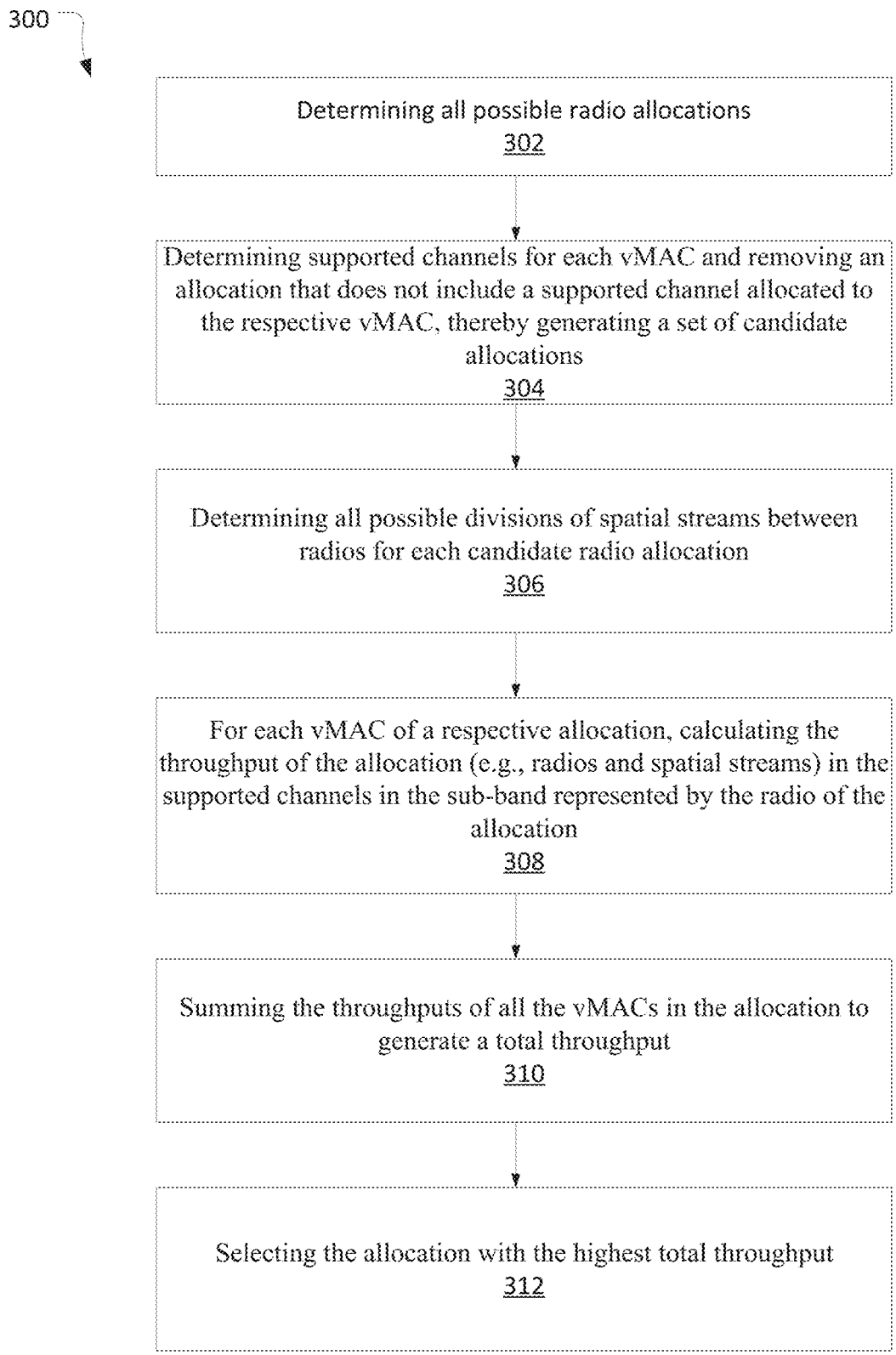
FIG. 3 illustrates an allocation process in accordance with some embodiments.

The goal of the allocation process is to find the allocation RM: MAC->RAD and the spatial stream division between the radios, which maximize the overall throughput of the system. An example of the process 300 is shown in FIG. 3.

At 302, the process 300 may include determining all possible radio allocations, e.g., all $K^N$ radio allocations of the type RM[0], RM[1], . . . . RM[N−1].

At 304, the process 300 may include determining supported channels for each vMAC and removing an allocation that does not include a supported channel allocated to the respective vMAC, thereby generating a set of candidate allocations. For example, allocation RM may be removed from consideration if there is a vMAC MACi in which RM[i]=j but Rj has no channel in the supported channels of MACi.

At 306, the process 300 may include determining all possible spatial streams division between radios for each candidate radio allocation (e.g., that is left after block 304). For example, if the device is capable of 2×2 spatial streams (2 Rx steams and 2 Tx streams) with two radios, there may be 9 possible spatial stream allocations per radio as shown in Table 4.

TABLE 4

| RAD$_0$ (e.g., 5170-5815) | RAD$_1$ (e.g., 5935-7120) |
|---|---|
| 2 × 2 | 0 × 0 |
| 2 × 1 | 0 × 1 |
| 2 × 0 | 0 × 2 |
| 1 × 2 | 1 × 0 |
| 1 × 1 | 1 × 1 |
| 1 × 0 | 1 × 2 |
| 0 × 2 | 2 × 0 |
| 0 × 1 | 2 × 1 |
| 0 × 0 | 2 × 2 |

In general, if there are NSSTX TX spatial streams and NSSRX RX spatial streams, and R radios, there are $$\binom{NSS_{TX} + R - 1}{R - 1}\binom{NSS_{RX} + R - 1}{R - 1}$$

different allocations of spatial streams to radios.

At 308, the process 300 may include, for each vMAC of a respective allocation, calculating the throughput of the allocation (e.g., radios and spatial streams) in the supported channels in the sub-band represented by the radio of the allocation (e.g., RM[i]). For example, calculating the throughput of the allocation may include calculating a base throughput (e.g., as a function of the number of spatial streams in the radio for all the spatial streams of different allocations between the radios and bandwidth (BW) at highest modulation and coding scheme (MCS)). Calculating the throughput may further include calculating a cost function (e.g., the cost function may be equal to Tx duty cycle+$CR_{Mi}$). Additionally, calculating the throughput may include choosing a best channel based on the base throughput and the cost function. For example, the best channel may be the channel in which the base throughput multiplied by cost function is the highest from all supported channels of the vMAC in the sub-band represented by radio RM[i] and the current allocation of spatial streams.

At 310, the process 300 may include summing the throughputs (e.g., as determined by block 308) of all the vMACs in the allocation to generate a total throughput. The total throughput may correspond to the grade of the allocation.

Operations 308 and 310 may be repeated for each candidate allocation determined in operation 306. For example, there may be $k^n$ $$\binom{NSS_{TX} + R - 1}{R - 1}\binom{NSS_{RX} + R - 1}{R - 1}$$

total allocations

At 312, the process 300 may include selecting the allocation with the highest total throughput (e.g., grade). Accordingly, the process 300 may enable optimization of the maximum available overall throughput.

Note that in some embodiments, there may be additional constraints on the process 300. For example, a specific vMAC may be required to use the same channel as another vMAC in the same band (for example SoftAP should be in the same channel of another vMAC because SoftAP cannot leave the channel for TDM), or a specific vMAC may need to use a minimum number of spatial streams, etc. Additionally, when Tx duty cycle is zero or limited (e.g. for channel sensing, ranging, radar detection, and/or network discovery, etc.), the impact on concurrent operation is minor. In some embodiments, the constraints may be taken into account in determining the candidate allocations (e.g., at blocks 304 and/or 306 in process 300).

Table 5 illustrates an example of concurrency requirements that may apply to the wireless station in some embodiments. The concurrency requirements may place one or more constraints on the allocation process. The requirements are shown for a plurality of roles of the wireless station that correspond to different WLAN operations, such as BSS1 (e.g., client access to the internet via the access point), BSS2 and/or P2P client, a P2P group owner and/or SoftAP, a dock (e.g., for wireless display), sensing (e.g., channel state information (CSI), scanning environment for movement and/or presence of people, etc.), radar detection, wake-up radio (WUR) Rx (e.g., for IoT devices), WUR Tx (e.g., for IoT devices), and fine-time measurement (FTM) (e.g., ranging, such as measurement range to a known device (e.g., an AP), determination of location of wireless station, etc.).

For each role, Table 5 illustrates the traffic profile (e.g., whether there is typically a high volume of Tx and/or Rx communication, whether the communication is periodic or bursty, etc.), expected performance, a bandwidth of the associated spatial stream (Nss). Additionally, Table 5 illustrates the frequency sub-bands (e.g., Unlicensed National Information Infrastructure (U-NII or UNII) bands) on which the role is permitted to operate, with cells marked with a "Y" corresponding to sub-bands on which the role is permitted to operate, cells marked with a "N" corresponding to sub-bands on which the role is not permitted to operate, and cells marked with an "A" corresponding to sub-bands for which it is presently unclear based on regulations whether the role is permitted to use the respective bands. The "X" indicates that the corresponding sub-band is permitted in some geographical areas but not others (e.g., allowed in the U.S., but not in Europe).

TABLE 5

| Role | Traffic Profile | Expected Performance | Nss, BW | UNII-1 | UNII-2 DFS | UNII-2e DFS | UNII-3 | UNII-5 LOW | UNII-5 HIGH | UNII-7/8 |
|---|---|---|---|---|---|---|---|---|---|---|
| BSS1 | High Tx + Rx | Max | Max, Max | Y | Y | Y | Y | Y, X | Y | Y |
| BSS2/ P2P client | Bursty Tx + Rx | Short range | Max, Max | Y | Y | Y, X | Y | Y | Y | Y |
| GO/SoftAP | High Tx + Rx | Max | 2, 80 MHz | Y | Y | Y | Y | A | A | A |
| Dock | High Tx + Rx | Short range | 2, 80 MHz | Y | Y | Y | Y | A | A | A |
| Sensing-CSI, scan | Periodic low Rx, no Tx | Max Rx, no Tx, No RTC | 2, 80 MHz | Y | Y | Y | Y | Y | Y | Y |
| Radar Detection | | Low Rx, no Tx, No RTC | 1, 40 MHz | N | Y | Y | N | N | N | N |
| WUR Rx | | | 1, 20 MHz | Y | N | N | Y | N | N | N |
| WUR Tx | | | 1, 20 MHz | Y | N | N | Y | N | N | N |
| FTM Responder | Low Tx, Med Rx | Max | 2, 80 MHz | Y | Y | Y | Y | Y | Y | Y |

Figure 4:
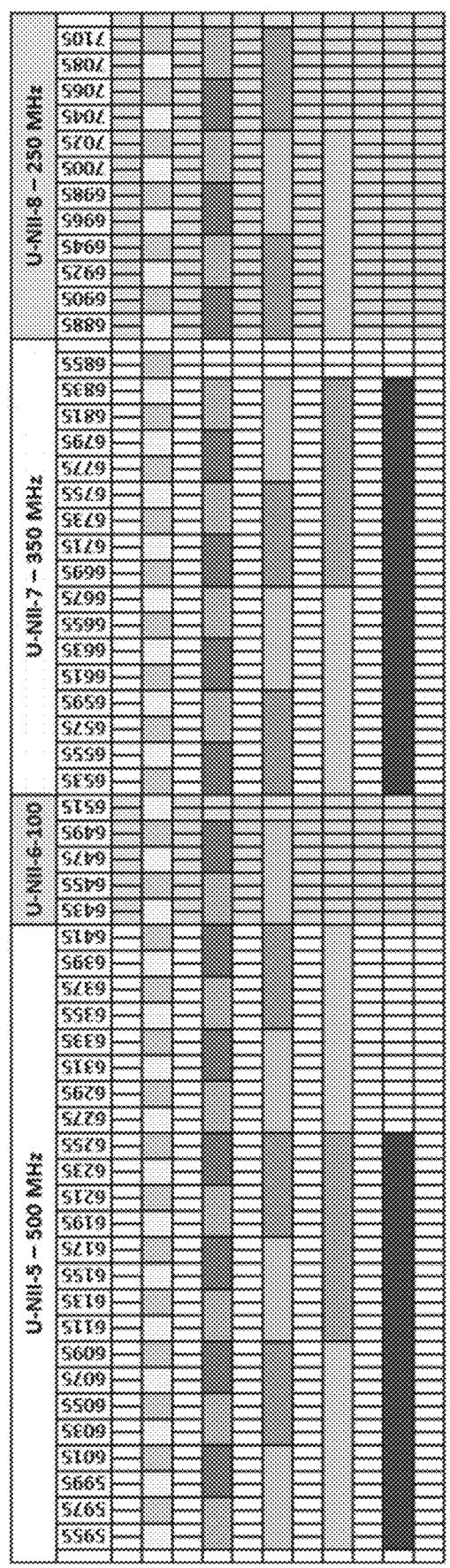
FIG. 4 illustrates frequency bands that may be used in accordance with some embodiments.

FIG. 4 illustrates UNII sub-bands and channel allocations proposed by the FCC, on which the wireless station may operate in accordance with various embodiments. The wireless station may use the allocation process described herein to allocate resources for operation on the UNII sub-bands.

The sub-bands may have one or more requirements (e.g., regulatory requirements such as those provided by the FCC). The requirements may place corresponding constraints on the allocation process, as described herein. For example, some proposed FCC requirements for operation in the 6 GHz band include:

In the 5.925-6.425 GHz and 6.525-6.875 GHz sub-bands, unlicensed devices may only be allowed to transmit under the control of an automated frequency control (AFC) system. These frequencies are heavily used by point-to-point microwave links and some fixed satellite systems. The AFC system may identify frequencies on which unlicensed devices may operate without causing harmful interference to fixed point-to-point microwave receivers.

In the 6.425-6.525 GHz and 6.875-7.125 GHz sub-bands, unlicensed devices may be restricted to indoor use and may operate at lower power, without an AFC system. These frequencies are used for mobile services, such as the Broadcast Auxiliary Service and Cable Television Relay Service, as well as fixed and fixed satellite services. The itinerant nature of the mobile services makes the use of an AFC system impractical. The combination of lower power and indoor operations may protect licensed services operating on these frequencies from harmful interference.

Standard-power access point location information must be accurate to ensure that unlicensed devices operate only outside the exclusion zones.

Client Devices-It has been proposed to require client devices that operate in the UNII-5 and UNII-7 bands to be under the control of a standard-power access point. This requirement will help prevent uncontrolled operation of client devices on a peer-to-peer basis that would pose a greater risk of causing harmful interference to microwave links.

In some embodiments, a wireless station (e.g., STA 108a-d and/or 200) may include additional features to facilitate the concurrent operation of multiple radios as described herein. For example, a wireless station with T transmitters and R receivers for N spatial streams (e.g., NssTx×NssRx) may include one of the following configurations of TxR: N×N, (N−1)×(N−1)+1×1, (N−1)×(N−1)+0×1, (N−2)×(N−2)+(N−2)×(N−2) for N>3, etc. The configuration may enable concurrent operation in multiple sub-bands of a frequency band (e.g., high-band (HB) and ultra-high band (UHB) operation).

Furthermore, in some embodiments, the wireless station may include features in the radio circuits that may facilitate dynamic allocation of the radio resources. For example, in some embodiments, multiple low-noise amplifiers (LNAs) may be coupled to a single tap of a diplexer. Accordingly, multiple vMACs operating in the same frequency band may share one or more antennas via the respective LNAs. Each vMAC may control the gain of its respective LNA.

Additionally, or alternatively, the RF filters of the radio circuits may be configured to enable concurrent operation in different sub-bands of a frequency band. In one non-limiting example, one of the following options may be used to separate the 5-7 GHz frequency band into two sub-bands and enable concurrent operation in both sub-bands:
  a. 5170-5815 GHz and 5935-7120 GHz (guard band=120 MHz) (corresponding to UNII1-3 and UNII5-UNII8, respectively); or
  b. 5170-5.330 GHz and 5490-7125 GHz (guard band=160 MHz) (corresponding to UNII1-2 and UNII2e-UNII8, respectively).

Figure 5:
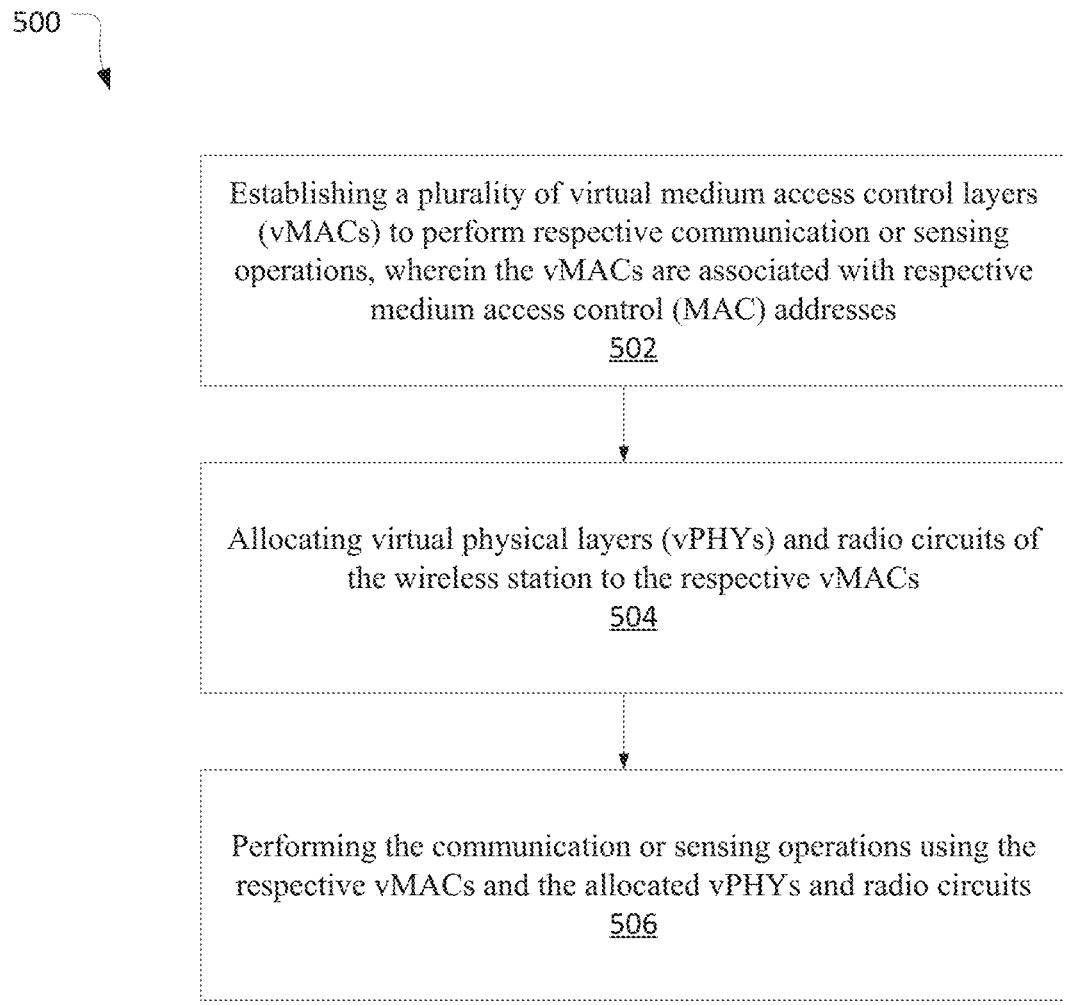
FIG. 5 illustrates an operation flow/algorithmic structure in accordance with some embodiments.

FIG. 5 illustrates an operation flow/algorithmic structure 500 in accordance with some embodiments. The operation flow/algorithmic structure 500 may be implemented by a wireless station, for example STA 108a-d and/or 200, or components thereof, for example, baseband circuitry and/or RF circuitry of an STA.

At 502, the operation flow/algorithmic structure 500 may include establishing a plurality of virtual medium access control layers (vMACs) to perform respective communication or sensing operations, wherein the vMACs are associated with respective medium access control (MAC) addresses. In some embodiments, the communication or sensing operations may include two or more of: BSS communication (e.g., to access the Internet via a WLAN), P2P communication, dock communication, ranging, location sensing, WUR reception, WUR transmission, and/or another operation (e.g., including operations shown in Table 5 and/or discussed elsewhere herein).

At 504, the operation flow/algorithmic structure 500 may further include allocating virtual physical layers (vPHYs) and radio circuits of the wireless station to the respective vMACs. In some embodiments, the allocation may be made based on one or more constraints associated with the respective vMACs/operations. For example, the constraints may include one or more of: a required channel, an interdependency with another vMAC, a minimum number of required spatial streams, and/or another constraint.

At 506, the operation flow/algorithmic structure 500 may further include performing the communication or sensing operations using the respective vMACs and the allocated vPHYs and radio circuits. In embodiments, the allocations may be dynamically updated over time (e.g., as the needs of the vMACs/operations change, the number and/or type of operations changes, etc.). For example, the allocations may be updated periodically and/or responsive to one or more triggers.

Figure 6:
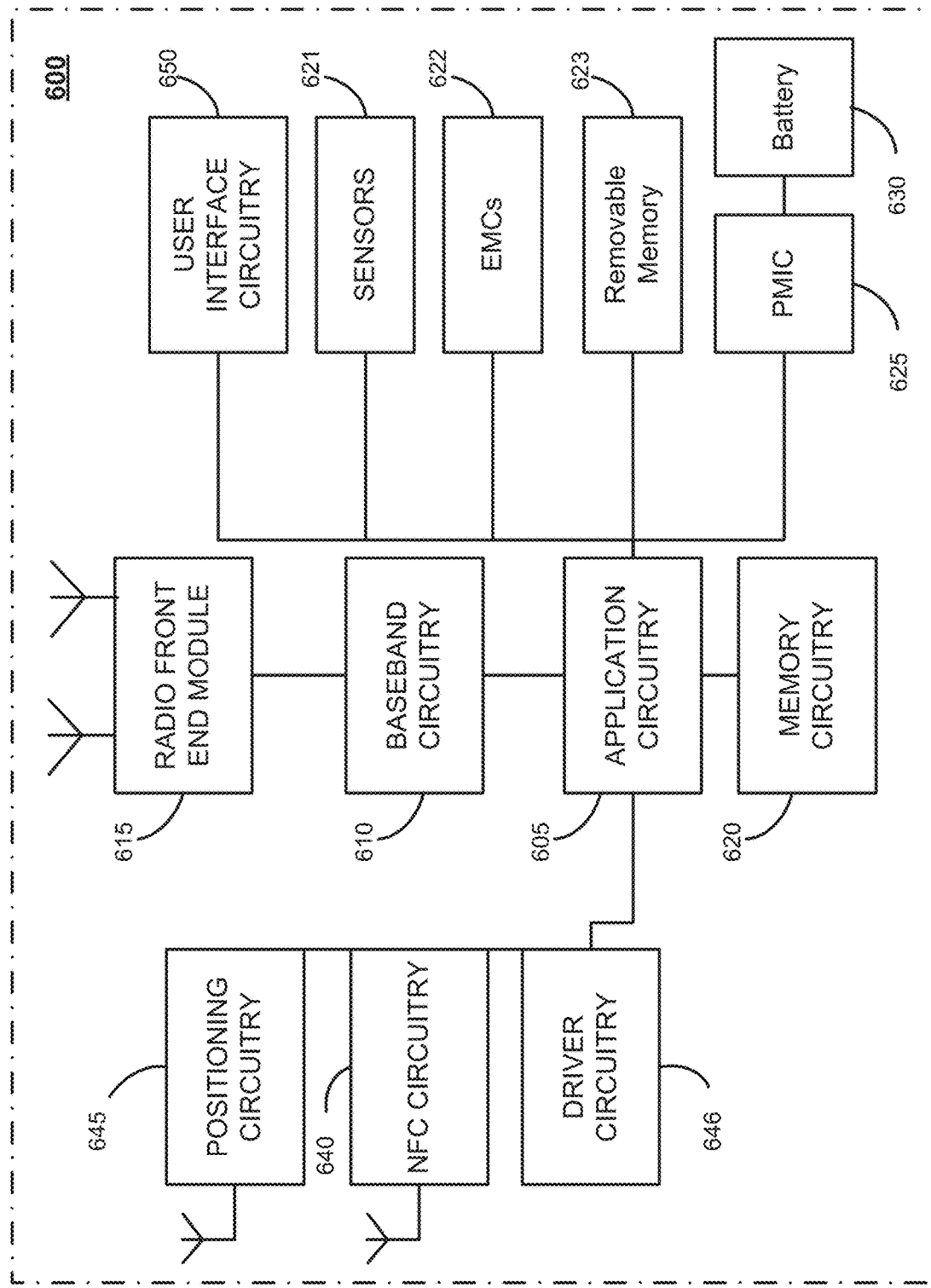
FIG. 6 illustrates an example communication device (e.g., station (STA)) in accordance with various embodiments.

FIG. 6 illustrates an example of a platform 600 (or "device 600") in accordance with various embodiments. The platform 600 may correspond to the multi-radio wireless station described herein, e.g., STA 100 and/or 200.

The platform 600 may include any combinations of the components shown in the example. The components of platform 600 may be implemented as integrated circuits (ICs), portions thereof, discrete electronic devices, or other modules, logic, hardware, software, firmware, or a combination thereof adapted in the computer platform 600, or as components otherwise incorporated within a chassis of a larger system. The block diagram of FIG. 60 is intended to show a high level view of components of the computer platform 600. However, some of the components shown may be omitted, additional components may be present, and different arrangement of the components shown may occur in other implementations.

Application circuitry 605 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 605 may be coupled with or may include memory/storage elements and may be configured to execute instructions stored in the memory/storage to enable various applications or operating systems to run on the system 600. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 605 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 605 may comprise, or may be, a special-purpose processor/controller to operate according to the various embodiments herein.

As examples, the processor(s) of application circuitry 605 may include an Intel® Architecture Core™ based processor, such as a Quark™, an Atom™, an i3, an i5, an i7, or an MCU-class processor, or another such processor available from Intel® Corporation, Santa Clara, CA. The processors of the application circuitry 605 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 605 may be a part of a system on a chip (SoC) in which the application circuitry 605 and other components are formed into a single integrated circuit, or a single package, such as the Edison™ or Galileo™ SoC boards from Intel® Corporation.

Additionally or alternatively, application circuitry 605 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 605 may comprise logic blocks or logic fabric, and other interconnected resources that may be programmed to perform various functions, such as the procedures, methods, functions, etc. of the various embodiments discussed herein. In such embodiments, the circuitry of application circuitry 605 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 610 may be implemented, for example, as a solder-down substrate including one or more integrated circuits, a single packaged integrated circuit soldered to a main circuit board or a multi-chip module containing two or more integrated circuits. In various embodiments, the baseband circuitry 610 may implement the vMACs and/or vPHYs described herein. Additionally, the baseband circuitry 610 may determine the allocations of radios and/or vPHYs to vMACs as described herein. The various hardware electronic elements of baseband circuitry 610 are discussed infra with regard to FIG. 7.

The one or more RFEMs 615 may include one or more radio frequency integrated circuits (RFICs). The RFICs may include connections to one or more antennas or antenna arrays (see e.g., antenna array 611 of FIG. 6 infra), and the RFEM may be connected to multiple antennas. In embodiments, the RFEMs 615 may implement the radio circuits described herein, which may be dynamically allocated to respective vMACs. The various hardware electronic elements of RFEMs 615 are discussed infra with regard to FIG. 7.

The memory circuitry 620 may include any number and type of memory devices used to provide for a given amount of system memory. As examples, the memory circuitry 620 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 620 may be developed in accordance with a Joint Electron Devices Engineering Council (JEDEC) low power double data rate (LPDDR)-based design, such as LPDDR2, LPDDR3, LPDDR4, or the like. Memory circuitry 620 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 620 may be on-die memory or registers associated with the application circuitry 605. To provide for persistent storage of information such as data, applications, operating systems and so forth, memory circuitry 620 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 600 may incorporate the three-dimensional (3D) cross-point (XPOINT) memories from Intel® and Micron®.

Removable memory circuitry 623 may include devices, circuitry, enclosures/housings, ports or receptacles, etc. used to couple portable data storage devices with the platform 600. These portable data storage devices may be used for mass storage purposes, and may include, for example, flash memory cards (e.g., Secure Digital (SD) cards, microSD cards, XD picture cards, and the like), and USB flash drives, optical discs, external HDDs, and the like.

The platform 600 may also include interface circuitry (not shown) that is used to connect external devices with the platform 600. The external devices connected to the platform 600 via the interface circuitry include sensor circuitry 621 and electro-mechanical components (EMCs) 622, as well as removable memory devices coupled to removable memory circuitry 623.

The sensor circuitry 621 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 622 include devices, modules, or subsystems whose purpose is to enable platform 600 to change its state, position, and/or orientation, or move or control a mechanism or (sub)system. Additionally, EMCs 622 may be configured to generate and send messages/signalling to other components of the platform 600 to indicate a current state of the EMCs 622. Examples of the EMCs 622 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 600 is configured to operate one or more EMCs 622 based on one or more captured events and/or instructions or control signals received from a service provider and/or various clients.

In some implementations, the interface circuitry may connect the platform 600 with positioning circuitry 645. The positioning circuitry 645 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 645 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 645 may include a Micro-PNT IC that uses a master timing clock to perform position tracking/estimation without GNSS assistance. The positioning circuitry 645 may also be part of, or interact with, the baseband circuitry 610 and/or RFEMs 615 to communicate with the nodes and components of the positioning network. The positioning circuitry 645 may also provide position data and/or time data to the application circuitry 605, which may use the data to synchronize operations with various infrastructure (e.g., radio base stations), for turn-by-turn navigation applications, or the like In some implementations, the interface circuitry may connect the platform 600 with Near-Field Communication (NFC) circuitry 640. NFC circuitry 640 is configured to provide contactless, short-range communications based on radio frequency identification (RFID) standards, wherein magnetic field induction is used to enable communication between NFC circuitry 640 and NFC-enabled devices external to the platform 600 (e.g., an "NFC touchpoint"). NFC circuitry 640 comprises an NFC controller coupled with an antenna element and a processor coupled with the NFC controller. The NFC controller may be a chip/IC providing NFC functionalities to the NFC circuitry 640 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 640, or initiate data transfer between the NFC circuitry 640 and another active NFC device (e.g., a smartphone or an NFC-enabled POS terminal) that is proximate to the platform 600.

The driver circuitry 646 may include software and hardware elements that operate to control particular devices that are embedded in the platform 600, attached to the platform 600, or otherwise communicatively coupled with the platform 600. The driver circuitry 646 may include individual drivers allowing other components of the platform 600 to interact with or control various input/output (I/O) devices that may be present within, or connected to, the platform 600. For example, driver circuitry 646 may include a display driver to control and allow access to a display device, a touchscreen driver to control and allow access to a touchscreen interface of the platform 600, sensor drivers to obtain sensor readings of sensor circuitry 621 and control and allow access to sensor circuitry 621, EMC drivers to obtain actuator positions of the EMCs 622 and/or control and allow access to the EMCs 622, a camera driver to control and allow access to an embedded image capture device, audio drivers to control and allow access to one or more audio devices.

The power management integrated circuitry (PMIC) 625 (also referred to as "power management circuitry 625") may manage power provided to various components of the platform 600. In particular, with respect to the baseband circuitry 610, the PMIC 625 may control power-source selection, voltage scaling, battery charging, or DC-to-DC conversion. The PMIC 625 may often be included when the platform 600 is capable of being powered by a battery 630.

A battery 630 may power the platform 600, although in some examples the platform 600 may be mounted deployed in a fixed location, and may have a power supply coupled to an electrical grid. The battery 630 may be a lithium ion battery, a metal-air battery, such as a zinc-air battery, an aluminum-air battery, a lithium-air battery, and the like. In some implementations, such as in vehicle-to-everything (V2X) applications, the battery 630 may be a typical lead-acid automotive battery.

In some implementations, the battery 630 may be a "smart battery," which includes or is coupled with a Battery Management System (BMS) or battery monitoring integrated circuitry. The BMS may be included in the platform 600 to track the state of charge (SoCh) of the battery 630. The BMS may be used to monitor other parameters of the battery 630 to provide failure predictions, such as the state of health (SoH) and the state of function (SoF) of the battery 630. The BMS may communicate the information of the battery 630 to the application circuitry 605 or other components of the platform 600. The BMS may also include an analog-to-digital (ADC) convertor that allows the application circuitry 605 to directly monitor the voltage of the battery 630 or the current flow from the battery 630. The battery parameters may be used to determine actions that the platform 600 may perform, such as transmission frequency, network operation, sensing frequency, and the like.

A power block, or other power supply coupled to an electrical grid may be coupled with the BMS to charge the battery 630. In some examples, the power block 630 may be replaced with a wireless power receiver to obtain the power wirelessly, for example, through a loop antenna in the computer platform 600. In these examples, a wireless battery charging circuit may be included in the BMS. The specific charging circuits chosen may depend on the size of the battery 630, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 650 includes various input/output (I/O) devices present within, or connected to, the platform 600, and includes one or more user interfaces designed to enable user interaction with the platform 600 and/or peripheral component interfaces designed to enable peripheral component interaction with the platform 600. The user interface circuitry 650 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position (s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 600. The output device circuitry may also include speakers or other audio emitting devices, printer(s), and/or the like. In some embodiments, the sensor circuitry 621 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 600 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 7:
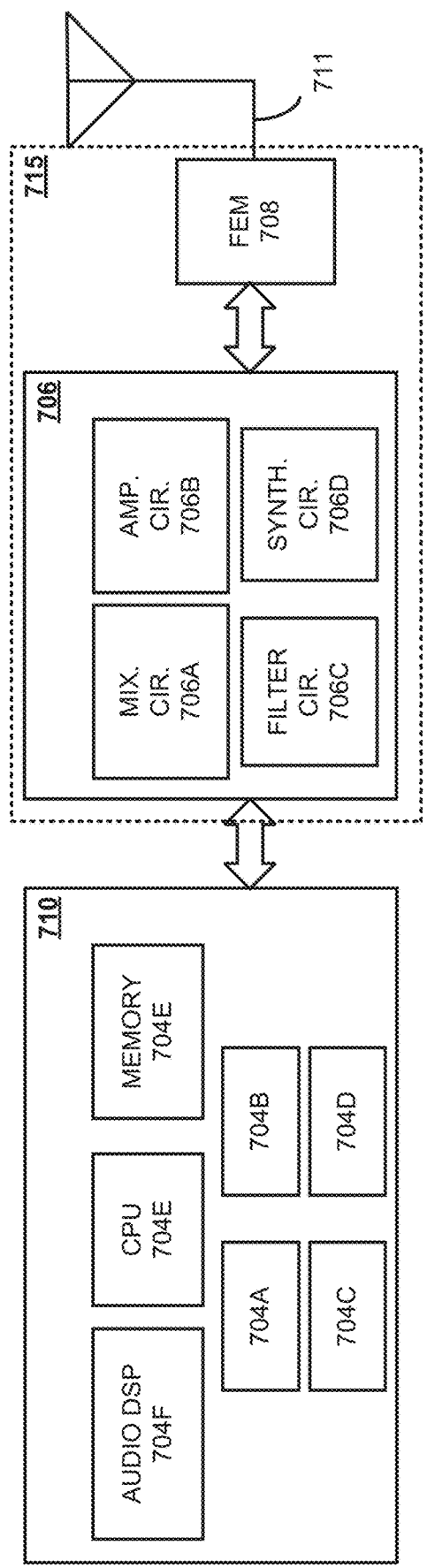
FIG. 7 illustrates example components of baseband circuitry and radio front end modules in accordance with various embodiments.

FIG. 7 illustrates example components of baseband circuitry 710 and radio front end modules (RFEM) 715 in accordance with various embodiments. The baseband circuitry 710 corresponds to the baseband circuitry 610 of FIG. 6. The RFEM 715 corresponds to the RFEM 615 of FIG. 6. As shown, the RFEMs 715 may include Radio Frequency (RF) circuitry 706, front-end module (FEM) circuitry 708, and antenna array 711 coupled together at least as shown.

The baseband circuitry 710 includes circuitry and/or control logic configured to carry out various radio/network protocol and radio control functions that enable communication with one or more radio networks via the RF circuitry 706. The radio control functions may include, but are not limited to, signal modulation/demodulation, encoding/decoding, radio frequency shifting, etc. In some embodiments, modulation/demodulation circuitry of the baseband circuitry 710 may include Fast-Fourier Transform (FFT), precoding, or constellation mapping/demapping functionality. In some embodiments, encoding/decoding circuitry of the baseband circuitry 710 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 710 is configured to process baseband signals received from a receive signal path of the RF circuitry 706 and to generate baseband signals for a transmit signal path of the RF circuitry 706. The baseband circuitry 710 is configured to interface with application circuitry 605 (see FIG. 6) for generation and processing of the baseband signals and for controlling operations of the RF circuitry 706. The baseband circuitry 710 may handle various radio control functions.

The aforementioned circuitry and/or control logic of the baseband circuitry 710 may include one or more single or multi-core processors. For example, the one or more processors may include a WLAN baseband processor 704A, a 4G/LTE baseband processor 704B, a 5G/NR baseband processor 704C, or some other baseband processor(s) 704D for other existing generations or communication protocols, generations or communication protocols in development or to be developed in the future (e.g., future WLAN generations, sixth generation (6G), etc.). In other embodiments, some or all of the functionality of baseband processors 704A-D may be included in modules stored in the memory 704G and executed via a Central Processing Unit (CPU) 704E. In other embodiments, some or all of the functionality of baseband processors 704A-D may be provided as hardware accelerators (e.g., FPGAs, ASICs, etc.) loaded with the appropriate bit streams or logic blocks stored in respective memory cells. In various embodiments, the memory 704G may store program code of a real-time OS (RTOS), which when executed by the CPU 704E (or other baseband processor), is to cause the CPU 704E (or other baseband processor) to manage resources of the baseband circuitry 710, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 710 includes one or more audio digital signal processor(s) (DSP) 704F. The audio DSP(s) 704F include elements for compression/decompression and echo cancellation and may include other suitable processing elements in other embodiments.

In some embodiments, each of the processors 704A-704E include respective memory interfaces to send/receive data to/from the memory 704G. The baseband circuitry 710 may further include one or more interfaces to communicatively couple to other circuitries/devices, such as an interface to send/receive data to/from memory external to the baseband circuitry 710; an application circuitry interface to send/receive data to/from the application circuitry 605 of FIG. 6); an RF circuitry interface to send/receive data to/from RF circuitry 706 of FIG. 7; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 625.

In alternate embodiments (which may be combined with the above described embodiments), baseband circuitry 710 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 710 may include protocol processing circuitry with one or more instances of control circuitry (not shown) to provide control functions for the digital baseband circuitry and/or radio frequency circuitry (e.g., the radio front end modules 715).

Although not shown by FIG. 7, in some embodiments, the baseband circuitry 710 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate one or more IEEE-based protocols when the baseband circuitry 710 and/or RF circuitry 706 are part of a Wi-Fi communication system. In the second example, the protocol processing circuitry would operate Wi-Fi MAC and logical link control (LLC) functions. In a second example, the protocol processing circuitry may operate LTE protocol entities and/or 5G/NR protocol entities when the baseband circuitry 710 and/or RF circuitry 706 are part of mmWave communication circuitry or some other suitable cellular communication circuitry. In the second example, the protocol processing circuitry would operate MAC, RLC, PDCP, SDAP, RRC, and NAS functions. The protocol processing circuitry may include one or more memory structures (e.g., 704G) to store program code and data for operating the protocol functions, as well as one or more processing cores to execute the program code and perform various operations using the data. The baseband circuitry 710 may also support radio communications for more than one wireless protocol. In various embodiments, the protocol processing circuitry may implement the vMACs and/or vPHYs as described herein.

The various hardware elements of the baseband circuitry 710 discussed herein may be implemented, for example, as a solder-down substrate including one or more integrated circuits (ICs), a single packaged IC soldered to a main circuit board or a multi-chip module containing two or more ICs. In one example, the components of the baseband circuitry 710 may be suitably combined in a single chip or chipset, or disposed on a same circuit board. In another example, some or all of the constituent components of the baseband circuitry 710 and RF circuitry 706 may be implemented together such as, for example, a system on a chip (SoC) or System-in-Package (SiP). In another example, some or all of the constituent components of the baseband circuitry 710 may be implemented as a separate SoC that is communicatively coupled with and RF circuitry 706 (or multiple instances of RF circuitry 706). In yet another example, some or all of the constituent components of the baseband circuitry 710 and the application circuitry 605 may be implemented together as individual SoCs mounted to a same circuit board (e.g., a "multi-chip package").

In some embodiments, the baseband circuitry 710 may provide for communication compatible with one or more radio technologies. For example, in some embodiments, the baseband circuitry 710 may support communication with a WLAN, an evolved universal terrestrial radio access network (E-UTRAN) or other wireless metropolitan area network (WMAN), and/or a wireless personal area network (WPAN). Embodiments in which the baseband circuitry 710 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path, which may include circuitry to down-convert RF signals received from the FEM circuitry 708 and provide baseband signals to the baseband circuitry 710. RF circuitry 706 may also include a transmit signal path, which may include circuitry to up-convert baseband signals provided by the baseband circuitry 710 and provide RF output signals to the FEM circuitry 708 for transmission.

In some embodiments, the receive signal path of the RF circuitry 706 may include mixer circuitry 706a, amplifier circuitry 706b and filter circuitry 706c. In some embodiments, the transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 710 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 710 and may be filtered by filter circuitry 706c.

In some embodiments, the mixer circuitry 706a of the receive signal path and the mixer circuitry 706a of the transmit signal path may include two or more mixers and may be arranged for quadrature downconversion and upconversion, respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a of the transmit signal path may be arranged for direct downconversion and direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 710 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage controlled oscillator (VCO), although that is not a requirement. Divider control input may be provided by either the baseband circuitry 710 or the application circuitry 605 depending on the desired output frequency. In some embodiments, a divider control input (e.g., N) may be determined from a look-up table based on a channel indicated by the application circuitry 605.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path, which may include circuitry configured to operate on RF signals received from antenna array 711, amplify the received signals and provide the amplified versions of the received signals to the RF circuitry 706 for further processing. FEM circuitry 708 may also include a transmit signal path, which may include circuitry configured to amplify signals for transmission provided by the RF circuitry 706 for transmission by one or more of antenna elements of antenna array 711. In various embodiments, the amplification through the transmit or receive signal paths may be done solely in the RF circuitry 706, solely in the FEM circuitry 708, or in both the RF circuitry 706 and the FEM circuitry 708.

In some embodiments, the FEM circuitry 708 may include a TX/RX switch to switch between transmit mode and receive mode operation. The FEM circuitry 708 may include a receive signal path and a transmit signal path. The receive signal path of the FEM circuitry 708 may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission by one or more antenna elements of the antenna array 711.

The antenna array 711 comprises one or more antenna elements, each of which is configured convert electrical signals into radio waves to travel through the air and to convert received radio waves into electrical signals. For example, digital baseband signals provided by the baseband circuitry 710 is converted into analog RF signals (e.g., modulated waveform) that will be amplified and transmitted via the antenna elements of the antenna array 711 including one or more antenna elements (not shown). The antenna elements may be omnidirectional, direction, or a combination thereof. The antenna elements may be formed in a multitude of arranges as are known and/or discussed herein. In some embodiments, the antenna array 711 may comprise metal strip (e.g., slot) antennas that are at least partially formed by a housing of the computing platform (e.g., platform 600). The antenna array 711 may comprise microstrip antennas or printed antennas that are fabricated on the surface of one or more printed circuit boards (e.g., rigid and/or flexible printed circuit boards). The antenna array 711 may be formed in as a patch of metal foil (e.g., a patch antenna) in a variety of shapes, and may be coupled with the RF circuitry 706 and/or FEM circuitry 708 using metal transmission lines or the like.

Figure 8:
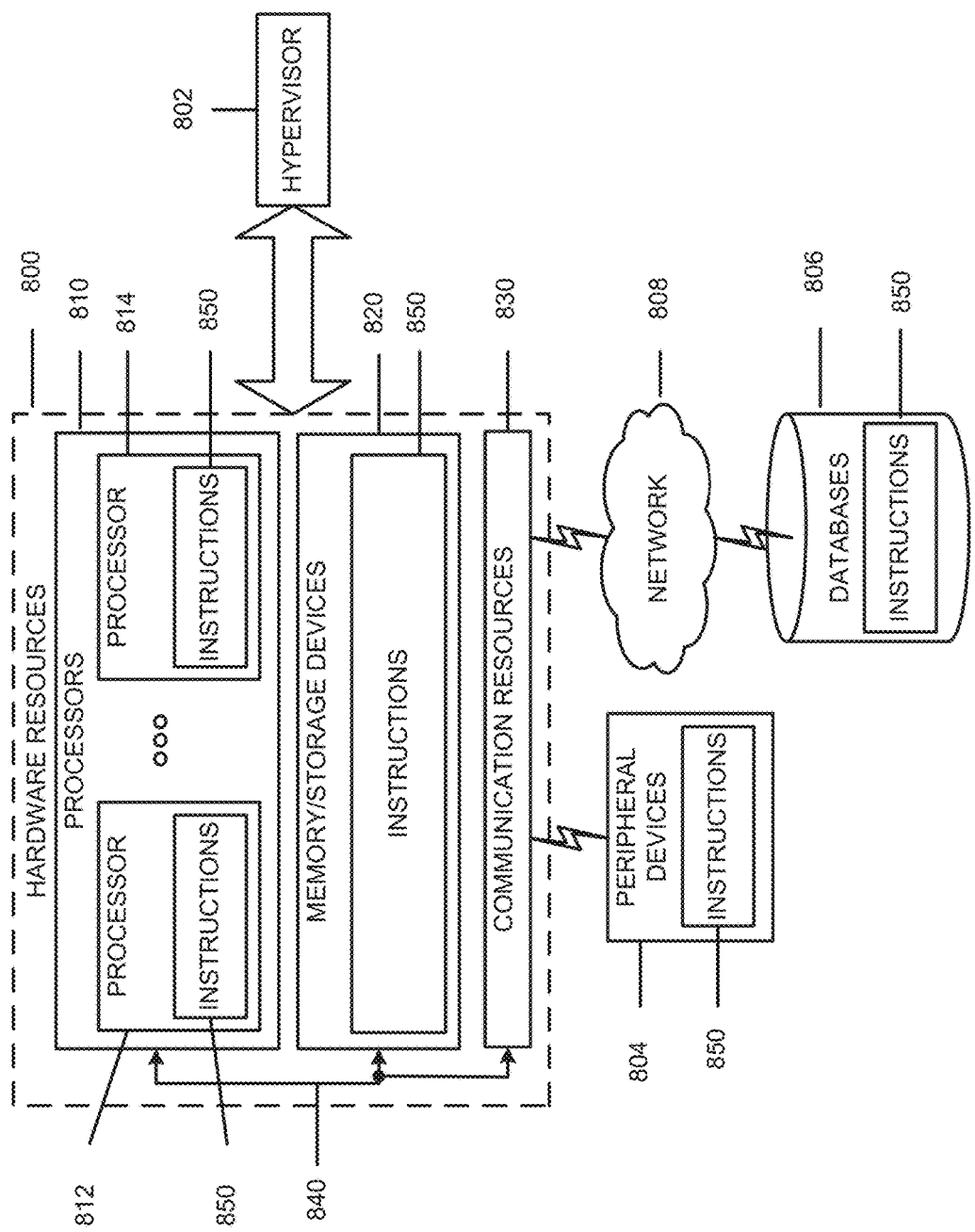
FIG. 8 is a block diagram illustrating components, according to some example embodiments, able to read instructions from a machine-readable or computer-readable medium (for example, a non-transitory machine-readable storage medium) and perform any one or more of the methodologies discussed herein.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 802 may be executed to provide an execution environment for one or more network slices/sub-slices to utilize the hardware resources 800. A "virtualized resource" may refer to compute, storage, and/or network resources provided by virtualization infrastructure to an application, device, system, etc.

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 1030 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 850 may comprise software, a program, an application, an applet, an app, or other executable code for causing at least any of the processors 810 to perform any one or more of the methodologies discussed herein. For example, the instructions 850 may cause one or more of the processors 810 to determine individual transmit power allocations and MCSs for a multiuser OFDM a downlink transmission as described herein.

The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

Some non-limiting Examples of various embodiments are provided below.

Example 1 may include one or more non-transitory, computer-readable media having instructions that, when executed by one or more processors, cause a wireless station to: establish a plurality of virtual medium access control layers (vMACs) to perform respective communication or sensing operations, wherein the vMACs are associated with respective medium access control (MAC) addresses; allocate virtual physical layers (vPHYs) and radio circuits of the wireless station to the respective vMACs; and perform the communication or sensing operations using the respective vMACs and the allocated vPHYs and radio circuits.

Example 2 may include the one or more NTCRM of Example 1, wherein the communication or sensing operations are performed on different frequency bands.

Example 3 may include the one or more NTCRM of Example 2, wherein two or more of the different frequency bands include frequencies between 5-7 Gigahertz (GHz).

Example 4 may include the one or more NTCRM of Example 1, wherein the radio circuits are allocated to the respective vMACs based on one or more constraints associated with individual vMACs of the plurality of vMACs.

Example 5 may include the one or more NTCRM of Example 4, wherein the one or more constraints include one or more of: a required channel, an interdependency with another vMAC, or a minimum number of required spatial streams.

Example 6 may include the one or more NTCRM of Example 1, wherein the instructions, when executed, are further to cause the wireless station to dynamically allocate radio resources to the radio circuits based on the communication or sensing operations.

Example 7 may include the one or more NTCRM of Example 1, wherein the instructions, when executed, are further to split a multiple input, multiple output (MIMO) radio circuit into two or more single input, single output (SISO) radio circuits, wherein the two or more SISO radio circuits are allocated to the respective vMACs.

Example 8 may include the one or more NTCRM of Example 1, wherein the allocation is performed to prioritize one or more of: an aggregated throughput, a throughput of a first vMAC of the plurality of vMACs, a quality of service (QOS), a range, or a power consumption Example 9 may include the one or more NTCRM of Example 1, wherein the vPHYs include two or more vPHYs with different capabilities or the radio circuits include two or more radio circuits with different capabilities.

Example 10 may include the one or more NTCRM of Example 1, wherein the communication or sensing operations include two or more of: basic service set (BSS) communication, peer-to-peer (P2P) communication, dock communication, ranging, or location sensing.

Example 11 may include an apparatus to be implemented in a wireless communication device, the apparatus comprising: physical layer (PHY) circuitry to implement a plurality of virtual physical layers (vPHYs); and processing circuitry coupled to the PHY circuitry, the processing circuitry to: implement a plurality of a plurality of virtual medium access control layers (vMACs) to perform respective communication or sensing operations, wherein the vMACs are associated with respective medium access control (MAC) addresses; determine one or more constraints of the respective communication or sensing operations; and allocate, based on the one or more constraints, the vPHYs and radio circuits of the wireless station to the respective vMACs for performance of the respective communication or sensing operations.

Example 12 may include the apparatus of Example 11, wherein the one or more constraints include one or more of: a required channel, an interdependency with another vMAC, or a minimum number of required spatial streams.

Example 13 may include the apparatus of Example 11, wherein the allocation is to prioritize one or more targets.

Example 14 may include the apparatus of Example 13, wherein the one or more targets include one or more of: an aggregated throughput, a throughput of a first vMAC of the plurality of vMACs, a quality of service (QOS), a range, or a power consumption.

Example 15 may include the apparatus of Example 11, wherein the instructions, when executed, are further to cause the wireless station to dynamically allocate radio resources to the radio circuits based on the communication or sensing operations.

Example 16 may include a computer system comprising: radio frequency (RF) circuitry including a plurality of radios; and baseband circuitry coupled to the RF circuitry. The baseband circuitry is to: implement a plurality of virtual medium access control layers (vMACs) associated with respective medium access control (MAC) addresses, wherein the vMACs are to perform respective communication or sensing operations including communication on a wireless local area network (WLAN); implement a plurality of virtual physical layers (vPHYs); and allocate the vPHYs and the radios to the respective vMACs based on the respective communication or sensing operations.

Example 17 may include the computer system of Example 16, wherein the communication or sensing operations are performed on different frequency bands.

Example 18 may include the computer system of Example 17, wherein two or more of the different frequency bands include frequencies between 5-7 Gigahertz (GHz).

Example 19 may include the computer system of Example 16, wherein the radio circuits are allocated to the respective vMACs based on one or more constraints associated with individual vMACs of the plurality of vMACs.

Example 20 may include the computer system of Example 19, wherein the one or more constraints include one or more of: a required channel, an interdependency with another vMAC, or a minimum number of required spatial streams.

Example 21 may include the computer system of Example 16, wherein the processor circuitry is further to dynamically allocate radio resources of the RF circuitry to the respective radios based on the communication or sensing operations.

Example 22 may include the computer system of Example 16, wherein the radios include a multiple input, multiple output (MIMO) radio, and wherein the processor circuitry is further to split the MIMO radio into two or more single input, single output (SISO) radios, wherein the two or more SISO radios are allocated to different vMACs of the respective vMACs.

Example 23 may include the computer system of Example 16, wherein the allocation is performed to prioritize one or more of: an aggregated throughput, a throughput of a first vMAC of the plurality of vMACs, a quality of service (QOS), a range, or a power consumption Example 24 may include the computer system of Example 16, wherein the vPHYs include two or more vPHYs with different capabilities or the radios include two or more radios with different capabilities.

Example 25 may include the computer system of Example 16, wherein the communication or sensing operations further include: another WLAN communication, peer-to-peer (P2P) communication, dock communication, ranging, or location sensing.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. One or more non-transitory, computer-readable media (NTCRM) having instructions that, when executed by one or more processors, cause a wireless station to:
   establish a plurality of virtual medium access control layers (vMACs) to perform respective communication or sensing operations, wherein the vMACs are associated with respective medium access control (MAC) addresses;
   allocate virtual physical layers (vPHYs) and radio circuits of the wireless station to the respective vMACs;
   perform the communication or sensing operations using the respective vMACs and the allocated vPHYs and radio circuits; and
   split a multiple input, multiple output (MIMO) radio circuit into two or more single input, single output (SISO) radio circuits, wherein the two or more SISO radio circuits are allocated to the respective vMACs.

2. The one or more NTCRM of claim 1, wherein the communication or sensing operations are performed on different frequency bands.

3. The one or more NTCRM of claim 2, wherein two or more of the different frequency bands include frequencies between 5-7 Gigahertz (GHz).

4. The one or more NTCRM of claim 1, wherein the radio circuits are allocated to the respective vMACs based on one or more constraints associated with individual vMACs of the plurality of vMACs.

5. The one or more NTCRM of claim 4, wherein the one or more constraints include one or more of: a required channel, an interdependency with another vMAC, or a minimum number of required spatial streams.

6. The one or more NTCRM of claim 1, wherein the instructions, when executed, are further to cause the wireless station to dynamically allocate radio resources to the radio circuits based on the communication or sensing operations.

7. The one or more NTCRM of claim 1, wherein the allocation is performed to prioritize one or more of: an aggregated throughput, a throughput of a first vMAC of the plurality of vMACs, a quality of service (QOS), a range, or a power consumption.

8. The one or more NTCRM of claim 1, wherein the vPHYs include two or more vPHYs with different capabilities, or the radio circuits include two or more radio circuits with different capabilities.

9. The one or more NTCRM of claim 1, wherein the communication or sensing operations include two or more of: basic service set (BSS) communication, peer-to-peer (P2P) communication, dock communication, ranging, or location sensing.

10. An apparatus to be implemented in a wireless communication device, the apparatus comprising:
    physical layer (PHY) circuitry to implement a plurality of virtual physical layers (vPHYs); and
    processing circuitry coupled to the PHY circuitry, the processing circuitry to:
      implement a plurality of a plurality of virtual medium access control layers (vMACs) to perform respective communication or sensing operations, wherein the vMACs are associated with respective medium access control (MAC) addresses;
      determine one or more constraints of the respective communication or sensing operations; and
      allocate, based on the one or more constraints, the vPHYs and radio circuits of the wireless communication device to the respective vMACs for performance of the respective communication or sensing operations; and
      split a multiple input, multiple output (MIMO) radio circuit into two or more single input, single output (SISO) radio circuits, wherein the two or more SISO radio circuits are allocated to the vMACs.

11. The apparatus of claim 10, wherein the one or more constraints include one or more of: a required channel, an interdependency with another vMAC, or a minimum number of required spatial streams.

12. The apparatus of claim 10, wherein the allocation is to prioritize one or more targets.

13. The apparatus of claim 12, wherein the one or more targets include one or more of: an aggregated throughput, a throughput of a first vMAC of the plurality of vMACs, a quality of service (QOS), a range, or a power consumption.

14. The apparatus of claim 10, wherein the wireless communication device is to dynamically allocate radio resources to the radio circuits based on the communication or sensing operations.

15. A computer system comprising:
    radio frequency (RF) circuitry including a plurality of radios; and
    baseband circuitry coupled to the RF circuitry, the baseband circuitry to:
      implement a plurality of virtual medium access control layers (vMACs) associated with respective medium access control (MAC) addresses, wherein the vMACs are to perform respective communication or sensing operations including communication on a wireless local area network (WLAN);
      implement a plurality of virtual physical layers (vPHYs); and
      allocate the vPHYs and the radios to the respective vMACs based on the respective communication or sensing operations;
      wherein the radios include a multiple input, multiple output (MIMO) radio, and wherein the baseband circuitry is further to split the MIMO radio into two or more single input, single output (SISO) radios, wherein the two or more SISO radios are allocated to different vMACs of the respective vMACs.

16. The computer system of claim 15, wherein the communication or sensing operations are performed on different frequency bands.

17. The computer system of claim 16, wherein two or more of the different frequency bands include frequencies between 5-7 Gigahertz (GHz).

18. The computer system of claim 15, wherein the radios are allocated to the respective vMACs based on one or more constraints associated with individual vMACs of the plurality of vMACs.

19. The computer system of claim 18, wherein the one or more constraints include one or more of: a required channel, an interdependency with another vMAC, or a minimum number of required spatial streams.

20. The computer system of claim 15, wherein the baseband circuitry is further to dynamically allocate radio resources of the RF circuitry to the respective radios based on the communication or sensing operations.

21. The computer system of claim 15, wherein the allocation is performed to prioritize one or more of: an aggregated throughput, a throughput of a first vMAC of the plurality of vMACs, a quality of service (QOS), a range, or a power consumption.

22. The computer system of claim 15, wherein the vPHYs include two or more vPHYs with different capabilities, or the radios include two or more radios with different capabilities.

23. The computer system of claim 15, wherein the communication or sensing operations further include at least one of: another WLAN communication, peer-to-peer (P2P) communication, dock communication, ranging, or location sensing.

\* \* \* \* \*